US009521042B2

(12) United States Patent
Narayanan et al.

(10) Patent No.: US 9,521,042 B2
(45) Date of Patent: Dec. 13, 2016

(54) SYSTEM AND METHOD FOR NETWORK ELEMENT MANAGEMENT

(71) Applicant: Dell Products L.P., Round Rock, TX (US)

(72) Inventors: Padmanabhan Narayanan, Tamilnadu (IN); Balaji Krishnan, Tamilnadu (IN); K. Kiran Kumar, Tamilnadu (IN)

(73) Assignee: DELL PRODUCTS L.P., Round Rock, TX (US)

( * ) Notice: Subject to any disclaimer, the term of this patent is extended or adjusted under 35 U.S.C. 154(b) by 752 days.

(21) Appl. No.: 13/829,477

(22) Filed: Mar. 14, 2013

(65) Prior Publication Data

US 2014/0280875 A1 Sep. 18, 2014

(51) Int. Cl.
*G06F 15/173* (2006.01)
*H04L 12/24* (2006.01)
*H04L 12/26* (2006.01)
*G06F 3/0484* (2013.01)

(52) U.S. Cl.
CPC .............. *H04L 41/12* (2013.01); *G06F 3/0484* (2013.01); *H04L 43/00* (2013.01)

(58) Field of Classification Search
CPC ......... H04L 41/22; H04L 43/00; G06F 3/0484
USPC ....................................................... 709/224
See application file for complete search history.

(56) References Cited

U.S. PATENT DOCUMENTS

| | | | | | |
|---|---|---|---|---|---|
| 5,991,814 | A | * | 11/1999 | Rzonca | H04L 41/22 709/205 |
| 8,694,886 | B2 | * | 4/2014 | Acedo | G06F 9/45512 345/501 |
| 2003/0140107 | A1 | * | 7/2003 | Rezvani | H04L 41/0233 709/208 |
| 2004/0160464 | A1 | * | 8/2004 | Reyna | G06F 8/34 715/854 |
| 2004/0221190 | A1 | * | 11/2004 | Roletto | H04L 41/0893 714/4.1 |
| 2007/0043585 | A1 | * | 2/2007 | Matos | G06Q 50/22 705/2 |
| 2007/0124005 | A1 | * | 5/2007 | Bourakov | G06F 9/45512 700/90 |
| 2009/0037551 | A1 | * | 2/2009 | Gupta | G06F 9/45512 709/208 |
| 2009/0172541 | A1 | * | 7/2009 | Acedo | G06F 9/45512 715/708 |

(Continued)

*Primary Examiner* — James Conaway
(74) *Attorney, Agent, or Firm* — Haynes & Boone, LLP

(57) ABSTRACT

A system and method for network element management includes a management window, a scroll buffer configured to store commands and responses, a console pane displayed in the management window and displaying a portion of the scroll buffer, and data structures. The system connects to a network element associated with network objects using a network, accept commands in the console pane, parse the commands, send the commands to the network element, receive and parse responses from the network element, update the data structures based on the commands and responses, create hot spots in the scroll buffer based on the commands and responses, spawn a GUI dialog based on a first network object associated with a first hot spot when the first hot spot is activated, and provide copies of first data structures selected from the data structures to the GUI dialog. The first data structures are associated with the first network object.

20 Claims, 8 Drawing Sheets

(56) References Cited

U.S. PATENT DOCUMENTS

| | | | | |
|---|---|---|---|---|
| 2009/0281677 A1* | 11/2009 | Botich | ............... | G06Q 30/0283 |
| | | | | 700/295 |
| 2011/0106752 A1* | 5/2011 | Blencowe | ............. | H04L 43/065 |
| | | | | 707/602 |
| 2012/0216135 A1* | 8/2012 | Wong | ................. | G06F 9/45533 |
| | | | | 715/764 |
| 2013/0073486 A1* | 3/2013 | Petrick | ................. | H04L 41/142 |
| | | | | 706/12 |
| 2014/0351703 A1* | 11/2014 | Ujiie | ....................... | G06F 9/542 |
| | | | | 715/733 |

\* cited by examiner

File 340
    New 410
    Open 411
    Telnet Options > 412
    SSH Options > 413
    Duplicate Session 414
    Event log 415
    Flush logs 416
    Saved sessions > 417
    Change settings > 418
    Move 419A
    Size 419B GUI Options 342
    Object Grouping > 420
    Object Selection > 421
    Scroll buffer size 422
    Network element connect > 423
        Telnet> 424
        HTTP> 425
        SNMP> 425

Parser Options 344
    Import CLI tree 430
    Network Element type > 431
        S-series > 432
        Z-series > 433
        E-series > 434
        C-series > 435

Tools 346
    System menu > 440
    Options > 441

Help 348

FIG. 4

```
File    CLI options         Parser Options                                    Help -- Fan Status --                    ┌─ 510              ┌─ 512
Unit Bay TrayStatus  |Fan0| Speed   |Fan1| Speed
-------------------------------------------------------
 0   0   up           up    11351    up    11351
 0   1   up           up    11348    up    11348

Speed in RPM

┌─ 520
-- |Power Supplies| --
Unit Bay Status Type
-------------------------------------
 0   0   up    AC
 0   1   up    AC ┌─ 532   ┌─ 534      ┌─ 536    ┌─ 538
-- Thermal Sensor Readings (deg C)
Unit |Sensor0| |Sensor1| |Sensor2| |Sensor3|
-------------------------------------------------------
 0     38       40        41        40

FTOS#show ip interface brief       ┌─ 541
Interface              IP-Address   OK  Method  Status  Protocol
ManagementEthernet 0/0 unassigned   YES Dhcp    up      up
TenGigabitEthernet 0/1 unassigned   NO  None    up      down
TenGigabitEthernet 0/2 unassigned   NO  None    up      down
TenGigabitEthernet 0/3 unassigned   YES None    up      up
TenGigabitEthernet 0/4 unassigned   NO  None    up      down
TenGigabitEthernet 0/5 unassigned   NO  None    up      down
```

SYSTEM AND METHOD FOR NETWORK ELEMENT MANAGEMENT

BACKGROUND

The present disclosure relates generally to information handling systems, and more particularly to network element management.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. As these network switching products become more sophisticated it may increase the complexity of the provisioning, configuring, and managing these network switching products and/or other network devices on a network.

Accordingly, it would be desirable to provide improved systems and methods for managing network elements such as network switching products and network devices.

SUMMARY

According to one embodiment, a splicer includes a management window, a scroll buffer configured to store commands and responses, a console pane displayed in the management window and being configured to display a portion of the scroll buffer, and one or more data structures. The splicer is configured to connect to a network element using a network, the network element being associated with one or more network objects, accept commands in the console pane, parse the commands, send the commands to the network element over the network, receive responses from the network element over the network, parse the received responses, update the one or more data structures based on information associated with the parsed commands and the parsed responses, create one or more hot spots in the scroll buffer based on information associated with the parsed commands and the parsed responses, determine whether a first hot spot selected from the one or more hot spots is activated, spawn a first GUI dialog based on a first network object associated with the first hot spot when the first hot spot is activated, and provide copies of one or more first data structures selected from the one or more data structures to the first GUI dialog. Each of the one or more data structures is associated with a corresponding network object selected from the one or more network objects. Each of the one or more hot spots is associated with a corresponding network object selected from the one or more network objects. The one or more first data structures are associated with the first network object.

According to another embodiment, a method of managing network elements includes launching a context-aware splicer including a console pane and a scroll buffer, connecting to a network element using a network, the network element being associated with one or more network objects, accepting commands in the console pane, parsing the commands, sending the commands to the network element over the network, receiving responses from the network element over the network, parsing the received responses, updating one or more data structures based on information associated with the parsed commands and the parsed responses, creating one or more hot spots in the scroll buffer based on information associated with the parsed commands and the parsed responses, determining whether a first hot spot selected from the one or more hot spots is activated, spawning a GUI dialog based on a first network object associated with the first hot spot when the first hot spot is activated, and providing copies of one or more first data structures selected from the one or more data structures to the GUI dialog. Each of the one or more data structures is associated with a corresponding network object selected from the one or more network objects. Each of the one or more hot spots is associated with a corresponding network object selected from the one or more network objects. The one or more first data structures are associated with the first network object.

According to yet another embodiment, an information handling system includes a workstation and a splicer being executed on the workstation. The splicer includes a management window, a scroll buffer configured to store commands and responses, a console pane displayed in the management window and being configured to display a portion of the scroll buffer, and one or more data structures. The splicer is configured to connect to a network element using a network, the network element being associated with one or more network objects, accept commands in the console pane, parse the commands, send the commands to the network element over the network, receive responses from the network element over the network, parse the received responses, update the one or more data structures based on information associated with the parsed commands and the parsed responses, create one or more hot spots in the scroll buffer based on information associated with the parsed commands and the parsed responses, determine whether a first hot spot selected from the one or more hot spots is activated, spawn a first GUI dialog based on a first network object associated with the first hot spot when the first hot spot is activated, and provide copies of one or more first data structures selected from the one or more data structures to the first GUI dialog. Each of the one or more data structures is associated with a corresponding network object selected from the one or more network objects. Each of the one or more hot spots is associated with a corresponding network object selected from the one or more network objects. The one or more first data structures are associated with the first network object.

BRIEF DESCRIPTION OF THE DRAWINGS

FIG. 4 is a simplified diagram of a menu tree of the context-aware management workstation window of FIG. 3 according to some embodiments.

FIG. 5 is a simplified diagram of hot spots in the context-aware management workstation window of FIG. 3 according to some embodiments.

FIGS. 7A and 7B are simplified diagrams of other context-aware GUI dialogs of the context-aware management workstation window of FIG. 3 according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
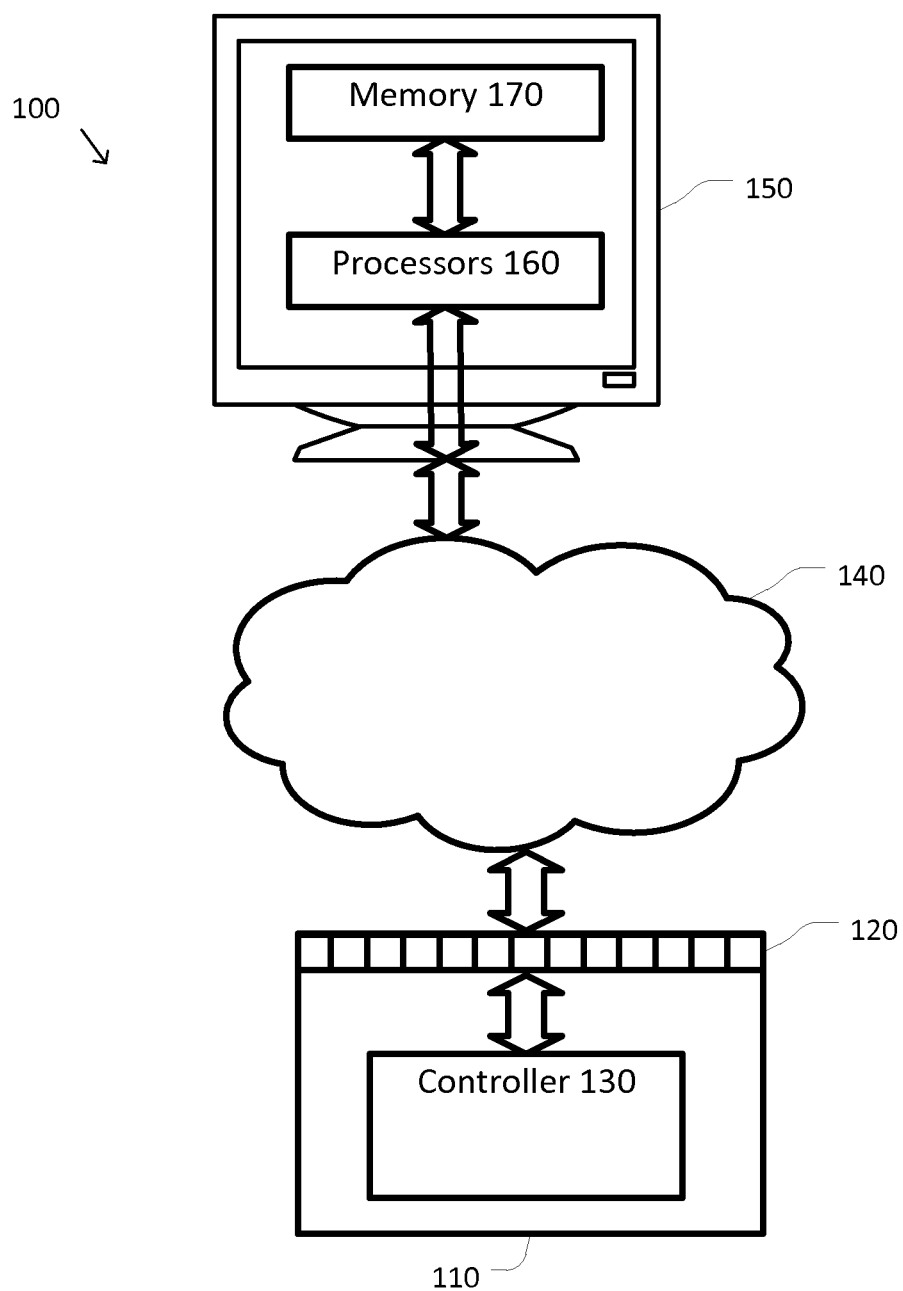
FIG. 1 is a simplified diagram of a network with a network management system according to some embodiments.

FIG. 1 is a simplified diagram of a network 100 with a network management system according to some embodiments. As shown in FIG. 1, network 100 includes one or more network elements 110. Each of the one or more network elements 110 is coupled to the rest of network 100 using one or more ports 120. Each of the one or more network elements 110 further includes a controller 130 that manages and/or controls the operation of the respective network element 110. In some examples, the controller 130 may include one or more processors. Each of the one or more network work elements 110 may further include memory for storing instructions, data, and/or network traffic. The one or more ports 120 couple each of the one or more network elements 110 together using a sub-network 140. In some examples, sub-network 140 may include others of the one or more network elements. 110. In some examples, one or more of the one or more network elements 110 may be network switching units.

Also coupled to sub-network 140 is a management workstation 150. In some examples, management workstation 150 may be a high-end workstation, a personal computer, a desktop, a laptop, a tablet computer, a personal data assistant (PDA), a smart phone, and/or any other type of network device allowing a user to connect to the network 100. In some examples, management workstation 150 may include one or more processors 160. In some examples, management workstation may include memory 170 including non-transient, tangible machine-readable media that include executable code that when run by the one or more processors 160, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. In some embodiments, the network 100 may include more than one management workstation 150.

Figure 2:
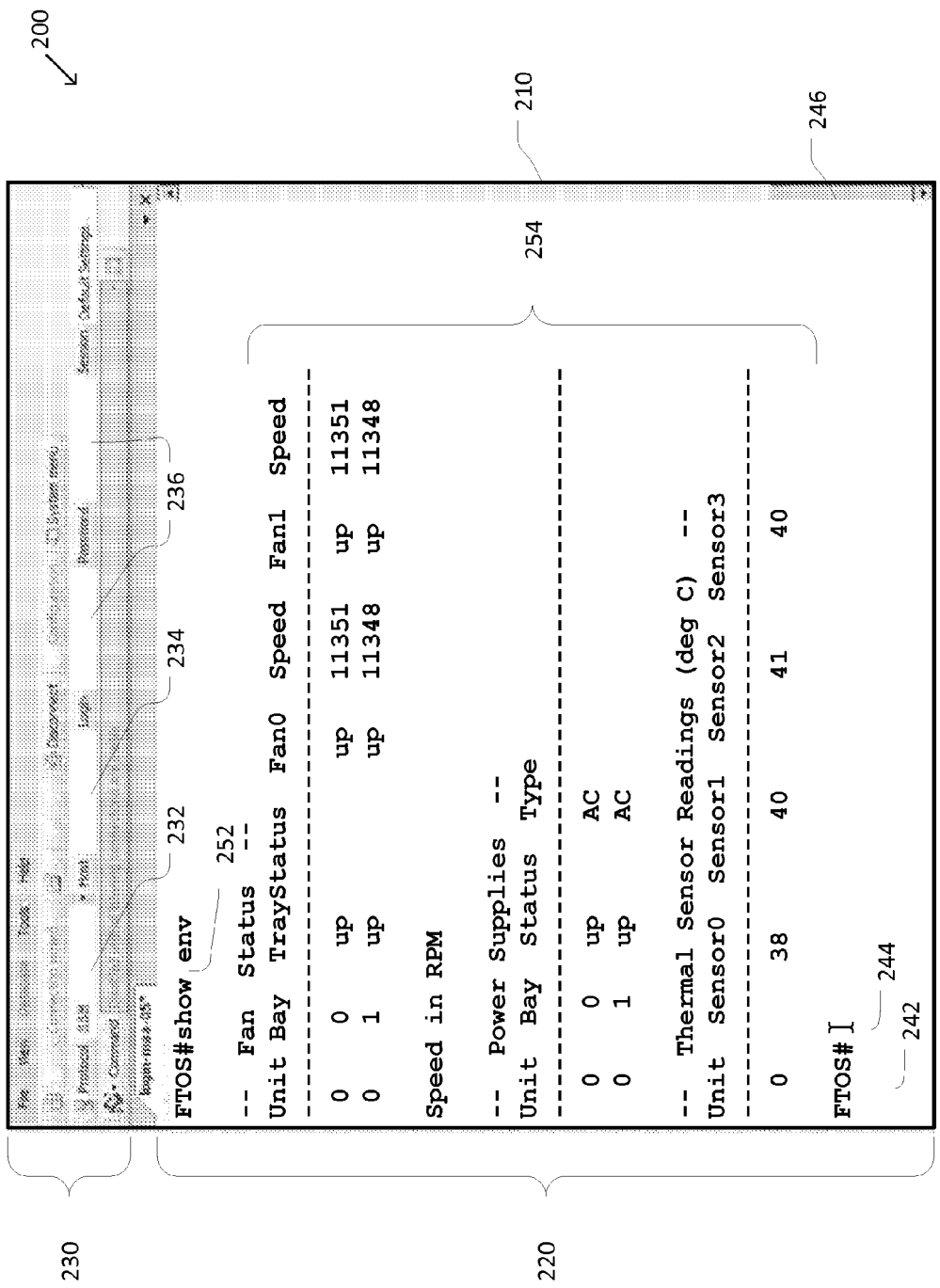
FIG. 2 is a simplified diagram of a management workstation window according to some embodiments.

FIG. 2 is a simplified diagram of a management workstation window 200 according to some embodiments. As shown in FIG. 2, management workstation window 200 provides an interface that may allow a user and/or network operator to manage one or more network elements. In some examples, the management workstation window 200 may be displayed on the management workstation 150. The management workstation window 200 is emulating a console display and/or terminal inside an operating system window 210. In addition to typical gadgets found in an operating system window, such as a menu bar, scrolling sliders, and the like, the window 210 further includes a console pane 220 and configuration dialogs 230. The configuration dialogs 230 include one or more user interface controls. A protocol selection control 232 allows the network operator to select a protocol to use when connecting to a network element to be managed. In some examples, the protocol may be selected from a group consisting of telnet, secure shell (SSH), hypertext transport protocol (HTTP), simple network management protocol (SNMP), and the like. In some examples, the protocol chosen may depend on a type of the network element and/or the protocols supported by the network element. A host selection control 234 allow the network operator to select the network element to be managed. In some examples, host selection control 234 may allow the network operator to enter an IP address of the network element. In some examples, host selection control 234 may allow the network operator to select a name and/or a nickname for the network element that may be resolved using a local and/or a remote lookup operation. In some examples, the lookup operation may be a domain name service (DNS) protocol, a lightweight directory access protocol (LDAP), and/or the like. Credential controls 236 are used by the network operator to provide login credentials for the network element. In some examples, the network operator may be required to login to the network element before management may begin.

As additionally shown in FIG. 2, console pane 220 is configured as a command line interface (CLI). Under typical operation, the network operator may use the CLI to send and receive text between the management workstation screen and the network element. to support this, the CLI includes a prompt 242, a cursor 244, and a scroll bar 246. The prompt 242 may typically be provided by the network element to indicate that it is ready to receive commands. The cursor 244 indicates a location where the network operator may enter commands. When the CLI is provided with a scroll buffer, the scroll bar 246 may indicate the approximate size of the scroll buffer and a current location within the scroll buffer that is being displayed. The console pane 220 currently displays that a "show env" command 252 has been entered by the network and a response 254 has been received from the network element. The response 254 includes information on two fans (fan0 and fan1), two power supplies, and four sensors (sensor0-sensor3). In some examples, the network operator may use the CLI to examine status of the network elements and/or send commands to the network element.

In some embodiments, the CLI may be a poor tool for managing the network element. In some examples, even though the network element may be able to recognize a broad range of commands, these commands may often be complex and require numerous parameters. In some examples, the network operator may typically be forced to type in lengthy commands including the numerous parameters. In some examples, the numerous parameters may depend on previously entered commands and/or status information from the network element. In some examples, the scroll buffer may provide simplify entry of commands by allowing the network operator to scroll through the scroll buffer to find information on the previously entered commands and/or the status information. In some examples, the scroll buffer may support select, copy, and paste operations. In some examples, the scroll buffer may provide a history mechanism to duplicate previously entered commands that may be edited using backspaces. In some examples, the CLI may also include support for typing completion after only a few characters in a command and/or a parameter are entered.

Figure 3:
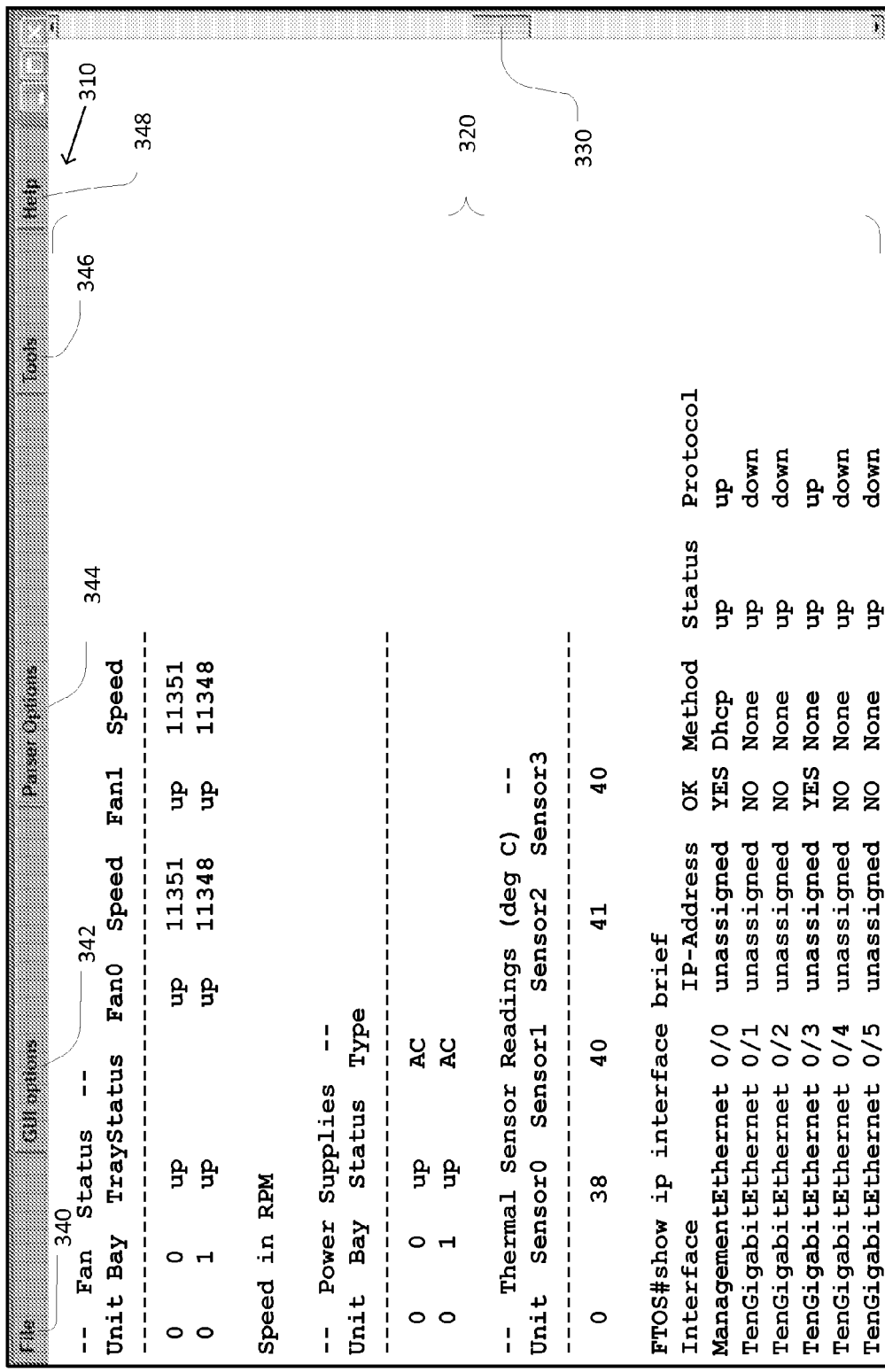
FIG. 3 is a simplified diagram of a context-aware management workstation window according to some embodiments.

FIG. 3 is a simplified diagram of a context-aware management workstation window 300 according to some embodiments. As shown in FIG. 3, the context-aware management workstation window 300 includes a menu bar 310, a CLI-based scroll buffer 320, and various control gadgets, such as a slider bar 330. In some examples, the menu bar 310 may include top-level entries for a File menu 340, a GUI Options menu 342, a Parser Options menu 344, a Tools menu 346, and a Help menu 348. In appearance, the context-aware management workstation window 300 shares similarities with management workstation window 200, but rather than just emulating a console display, the context-aware management workstation window 300 is aware of the context in which it operates and functions as a context-aware splicer.

A context-aware splicer is able to do more than just host a CLI session. In some examples, the context-aware splicer may use knowledge about a type of a network element being communicated with using the CLI session to facilitate and support management of the network element. In some examples, the context-aware splicer may parse commands entered into the CLI session by a network operator. In some examples, the context-aware splicer may parse responses to the commands to infer information regarding a configuration and/or a status of the network element. In some examples, the context-aware splicer may use the inferred information to facilitate and support management of the network element. In some examples, the context-aware splicer may identify network objects associated with the network element from the parsed commands and responses and determine characteristics of the identified network objects. In some examples, the context-aware splicer may inject characters and/or commands into the CLI session to facilitate and support management of the network element. In some examples, the context-aware splicer may provide the network operator with a list of context-specific options for use with a command being entered. In some examples, the context-aware splicer may use the inferred information to spawn additional context-aware graphical user interface (GUI) dialogs and/or context-aware management workstation windows to display the inferred information to the network operator and/or provide GUI controls for managing the network element. One of the many advantages of the context-aware splicer is that it operates by presenting a console-like connection to the network element so that the network element does not require any modification or software upgrade to communicate with the splicer rather than a non-context-aware CLI.

According to some embodiments, the context-aware splicer may be made context aware using a grammar-aware splicer or a pattern-search splicer. In some examples, a grammar-aware splicer may be supplied with semantics of the commands and responses being exchanged with the network element. In some examples, the semantics may be supplied with a syntax diagram, a CLI tree, or its equivalent. In some examples, the CLI tree may be provided using a file. In some examples, the CLI tree may be selected from a list. In some examples, the CLI tree may be determined based on a model and/or version of the network element. In some examples, by knowing the semantics of the commands, the grammar-aware splicer may make context-specific suggestions as commands are being entered. In some examples, by knowing the semantics of the commands and the responses, the grammar-aware splicer may intelligently parse the responses to infer information about the configuration, status, and management of the network element. In some examples, a pattern-search splicer may parse text in the scroll buffer for specific keywords. In some examples, the keywords may include common element names, interface names, version string patterns, operational status indicators, and the like.

FIG. 4 is a simplified diagram of a menu tree 400 of the context-aware management workstation window 300 of FIG. 3 according to some embodiments. As shown in FIG. 4, the menu bar 310 of the context-aware management workstation window or splicer 300 may be expanded to include many possible menu options. The top-level entries of the menu bar 310 include the File menu 340, the GUI Options menu 342, the Parser Options menu 344, the Tools menu 346, and the Help menu 348.

In some examples, the File menu 340 may include menu entries for New 410, Open 411, Telnet Options>412, SSH Options>413, Duplicate Session 414, Event log 415, Flush logs 416, Saved Sessions>417, Change Settings>418, and window manipulation options Move 419A and Size 419B. In some examples, menu entries with a trailing ">" may indicate an additional sub-menu. The New entry 410 may be used to create a new context-aware management workstation window. The Open entry 411 may be used to open a file. In some examples, the file may be inserted as commands into the scroll buffer 320. The Telnet Options>entry 412 may be used to open a sub-menu for viewing and setting options for a telnet session being hosted by the splicer 300. The SSH Options>entry 413 may be used to open a sub-menu for viewing and setting options for a SSH session being hosted by the splicer 300. The Duplicate Session entry 414 may be used to create a new splicer with any context-aware inferred information known by splicer 300. The Event log entry 415 may be used to view the event log. The Flush logs entry 416 may be used to flush any logs kept by splicer 300. The Saved sessions>entry 417 may be used to save and/or manage previous sessions of the splicer 300 that may include any context-aware inferred information learned during that session. The Change settings>entry 418 may be used to access a sub-menu for changing settings of the splicer 300. In some examples, this includes how splicer 300 interacts with a pointing device such as a mouse. The Move entry 419A and the Size entry 419B may be used to change the location or the size of the splicer 300 on a workstation screen.

In some examples, the GUI Options menu 342 may include a Object Grouping>entry 420, a Object Selection>entry 421, a Scroll buffer size entry 422, and a Network Element connect>entry 423. The Object Grouping>entry 420 may be used to access a sub-menu used to logically group or arrange network objects found in the splicer 300. The Option Selection>entry 421 may be used to access a sub-menu to select network objects found in the splicer 300. The Scroll buffer size entry 422 may be used to set a size of the scroll buffer that controls how much prior text from the splicer session is retained and may be accessed using the scroll bar 330. The Network Element connect>entry 423 may be used to access a connect sub-menu. In some examples, the connect sub-menu may include a Telnet>entry 424, a HTTP>entry 425, and/or a SNMP>entry 425 depending upon the network protocols supported for connecting the splicer 300 to a network element. In some examples, each of the Telnet>entry 424, the HTTP>entry 425, and the SNMP>entry 425 may be used to access a further sub-menu for viewing and/or setting options for a network session based on the respective protocol.

In some examples, the Parser Options menu 344 may include an Import CLI tree entry 430 and a Network Element type>entry 431. The Import CLI tree entry 430 may be used to select and import a CLI tree to provide semantics for a grammar aware splicer. The Network Element type>entry 431 may be used to access an element sub-menu of network element devices supported by the splicer 300. In some examples, the element sub-menu may include sub-menus for S-series>432, Z-series>433, E-series>434, and/or C-series>435 network elements.

In some examples, the Tools menu 346 may include a System menu>entry 440 and an Options>entry 441. The System menu>entry 440 may be used to access a sub-menu including options based on an operating system in which the splicer 300 is operating. In some examples, the operating system may include any window-based operating system. The Options>entry 441 may be used to access a sub-menu providing options used to configure the splicer 300. In some examples, the Help menu 348 may be used to access help information for the splicer 300.

FIG. 5 is a simplified diagram of hot spots in the context-aware management workstation window 300 of FIG. 3 according to some embodiments. As shown in FIG. 5, the context-aware management workstation window 300 may include one or more hot spots in the scroll buffer 320. In some examples, the one or more hot spots may represent network objects associated with the network element being managed. In some examples, the network objects and the associated one or more hot spots may be inferred by the splicer 300 based on text parsed in commands and/or responses in the scroll buffer 320. As the splicer 300 analyzes the scroll buffer to identify the one or more hot spots, the splicer 300 may also generate data structures for each of the network objects associated with a respective hot spot. The data structures may include inferred information about the network objects. The data structures may be stored in memory of a management workstation (e.g., the memory 170 of management workstation 150). The inferred information may vary based on a type of each of the network objects and a type of the network element with which it is associated. In some examples, the information may include object types, addresses, values, operational status, and the like. In some examples, parsing of the commands and/or the responses may be facilitated by the CLI tree selected using the Import CLI tree entry 430. In some examples, the splicer 300 may infer information from "show" commands, such as "show env", "show running config", "show tech-support", "show version", and the like.

Several of the one or more hot spots are shown in FIG. 5 as part of responses to a "show env" command and a "show ip interface brief" command. Based on syntax of the response to the "show env" and "show ip interface brief" commands, the splicer 300 recognizes several hot spots including hot spots for Fan0 510, Fan1 512, Power Supplies 520, Sensor0 532, Sensor1 534, Sensor2 536, Sensor3 538, ManagementEthernet 0/0 540, TenGigabitEthernet 0/1 541, TenGigabitEthernet 0/2 542, TenGigabitEthernet 0/3 543, TenGigabitEthernet 0/4 544, and TenGigabitEthernet 0/5 545. As shown in FIG. 5, each of the one or more hot spots is denoted by a dashed box around each of the hot spots, however it is understood that the one or more hot spots may be denoted in other fashions. In some examples, the one or more hot spots may not be visually highlighted. In some examples, the one or more hot spots may be designated using highlighting and/or alternative text colors.

According to some embodiments, each of the one or more hot spots may represent an active area in the scroll buffer 320. In some examples, the network operator may activate a respective one of the one or more hot spots using a pointing device, such as a mouse. In some examples, the respective hot spot may be activated by a left mouse button press when a cursor is over the hot spot. In some examples, the respective hot spot may be activated by a double mouse button press, a triple mouse button press, a right mouse button press, a mouse button press with a key board key press (e.g., shift), and the like. In some examples, the Options entry 441 may include a sub-menu entry for determining a type of event that activates the respective hot spot.

In some examples, when the respective hot spot is activated, the splicer 300 may display additional information regarding the object associated with the respective hot spot. For example, when the hot spot for Fan0 510 is activated, the splicer may display additional information about Fan0. In some examples, this may include any inferred information including that Fan0 is installed in unit 0, bay 0, is currently up/operational, and has a fan speed of 11351. In some examples, the inferred information may also include additional information about Fan0 based on other commands and/or responses located elsewhere in the scroll buffer 320. The splicer 300 may display the additional information using any of several methods.

Figure 6:
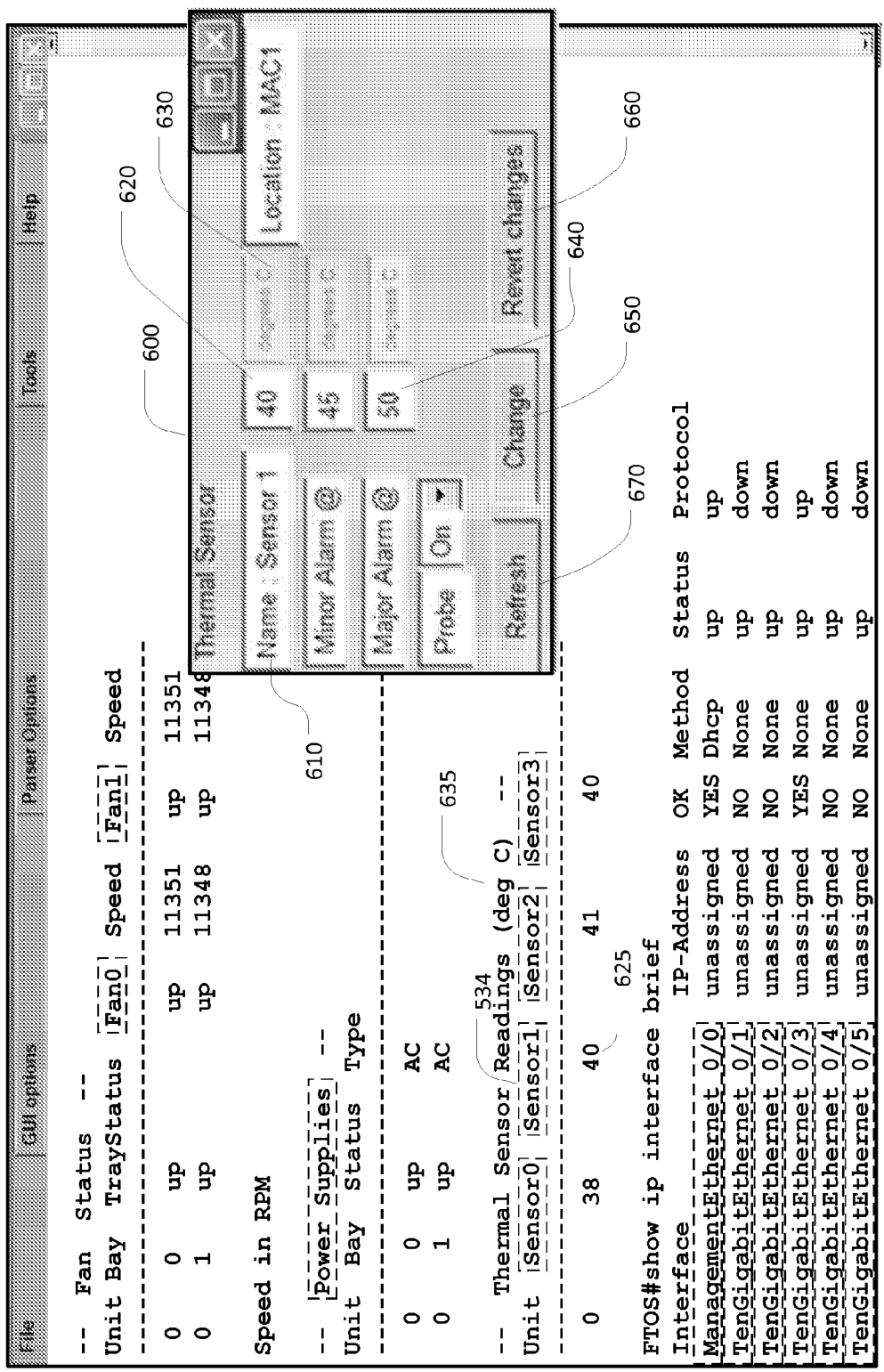
FIG. 6 is a simplified diagram of a context-aware GUI dialog of the context-aware management workstation window of FIG. 3 according to some embodiments.

FIG. 6 is a simplified diagram of a context-aware GUI dialog 600 of the context-aware management workstation window 300 of FIG. 3 according to some embodiments. As shown in FIG. 6, the context-aware GUI dialog 600 is spawned as a result of activation of a hot spot associated with Sensor1, such as the hot spot 534. Dialog 600 includes inferred information about Sensor1 that the splicer 300 has been able to determine. In some examples, the inferred information may be displayed based on copies of the data structures associated with Sensor1 that is maintained by splicer 300 as a result of its parsing of commands and/or responses in the scroll buffer 320. In some examples, the splicer 300 may provide the copies of the data structures corresponding to Sensor1 to dialog 600.

Dialog 600 displays the inferred information associated with Sensor1. A text field 610 displays the name of the object as parsed from the scroll buffer 320 in the hot spot 534. A text field 620 displays the current value of Sensor1 as parsed from the scroll buffer 320 at location 625. A text field 630 displays the units of Sensor1 as parsed from the scroll buffer 320 at location 635. Dialog 600 includes additional text fields, such as a text field 640 displaying a major alarm setting as determined from other inferred information parsed from other un-displayed locations in the scroll buffer 320. One or more of the fields in dialog 600 may include editable text fields and/or controls that may be used to make changes to Sensor1. In some examples, the major alarm value 640 may be edited by the network manager and the Change button 650 may be activated to have that change made to the Sensor1. In some examples, the change may be made by having dialog 600, through the splicer 300, inject a suitable "change" command into the session. In some examples, dialog 600 may initiate its own connection to the network element associated with Sensor1 to execute the "set" command. In some examples, the change may be reflected in the copies of the data structures for Sensor1 in dialog 600 and/or in the data structures for Sensor1 in the splicer 300. In some examples, dialog 600 may validate changes before having them made to Sensor1. In some examples, dialog 600 may include other controls. In some examples, the other controls may include a "Revert changes" button 660 to undo and/or reverse any changes made using dialog 600. In some examples, dialog 600 may include an additional copies of the data structures for Sensor1 as originally provided by the splicer 300. In some examples, the other controls may include a "Refresh" button 670 to obtain updated values for Sensor1. In some examples, the updated values may be obtained by injecting a suitable "show" command into the session using the splicer 300 and/or initiating a separate connection to the network element associated with Sensor1.

Figures 7A, 7B:
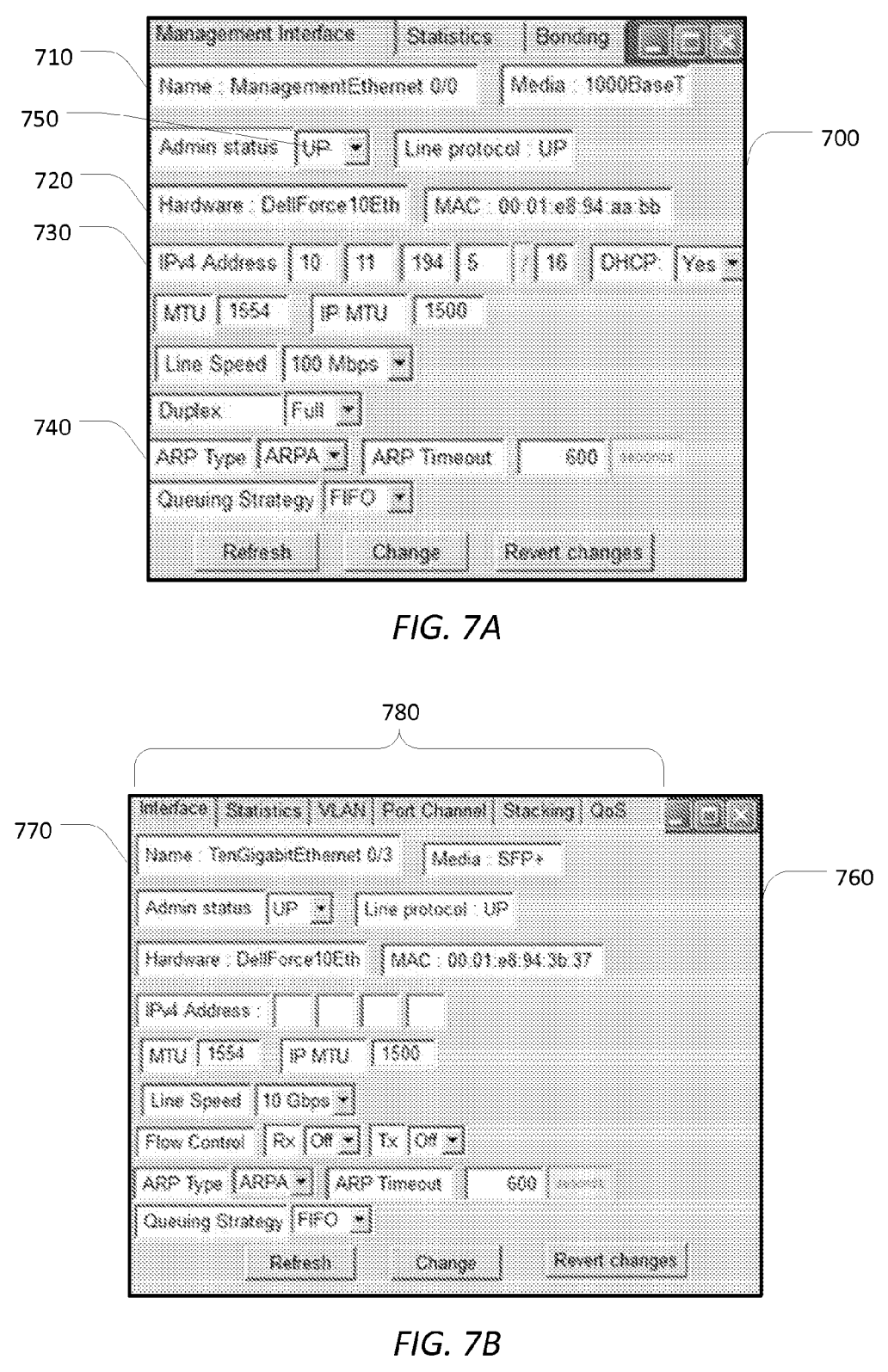

FIGS. 7A and 7B are simplified diagrams of other context-aware GUI dialogs of the context-aware management workstation window 300 of FIG. 3 according to some embodiments. FIG. 7A shows a context-aware GUI dialog 700 for the object ManagementEthernet 0/0. In some examples, dialog 700 may have been spawned as a result of activating the hot spot 540. Dialog 700 includes a text field 710 for the name "ManagementEthernet 0/0". Dialog 700 further displays other inferred information related to ManagementEthernet 0/0 as stored by splicer 300 in a data structure corresponding to ManagementEthernet 0/0. In some examples, the other inferred information may include a type of the object (e.g., hardware information 720), an address of the object (e.g., IPv4 address 730), and protocol settings (e.g., ARP settings 740). Dialog 700 may further include more complex controls. In some examples, a drop-down control 750 may be associated when there are only a limited number of options for a particular parameter or setting. In some examples, if the "Admin status" is changed to "DOWN" and then saved with a Change button, dialog 700 may inject a sequence of commands into the session of the splicer 300 or through its own connection to the network element associated with ManagementEthernet 0/0. In some examples, the sequence of commands may be:

conf t
interface ManagementEthernet 0/0
shut
exit

FIG. 7B shows a context-aware GUI dialog 760 for the object TenGigabitEthernet 0/3. In some examples, dialog 760 may have been spawned as a result of activating the hot spot 543. Dialog 760 includes a text field 770 for the name "TenGigabitEthernet 0/3". In some examples, dialog 760 may further include multiple tabs 780 in order to display all the potentially inferable information related to TenGigabitEthernet 0/3 as stored by splicer 300 in data structures corresponding to TenGigabitEthernet 0/3.

As discussed above and further emphasized here, FIGS. 6, 7A, and 7B are merely examples, which should not unduly limit the scope of the claims. One of ordinary skill in the art would recognize many variations, alternatives, and modifications. According to some embodiments, each object may use a dialog that is based on a type of the object. In some examples, a first object of a first type associated with a first network element of a second type may use a first dialog that is different than a second dialog for a second object of the first type associated with a second network element of a third type different from the second type. In some examples, templates and/or specifications for various dialogs may be selected based on a type of an object for which inferred information is to be displayed. In some examples, the templates and/or specifications may be selected based on a network element type selected using the Network Element type>entry 431. In some examples, the templates and/or specifications may be selected based on a CLI tree selected using the Import CLI tree entry 423. In some examples, the templates and/or specifications may be included in the imported CLI tree.

According to some embodiments, splicer 300 may also provide the network operator with a list of context-specific options for use with a command being entered. In some examples, as splicer 300 parses a command being entered by the network operator, splicer 300 may be able to use the imported CLI tree to provide a list of context-specific options. In some examples, when the network operator is entering a command associated with a fan, splicer may provide a context-specific list including "Fan0" and "Fan1".

Figure 8:
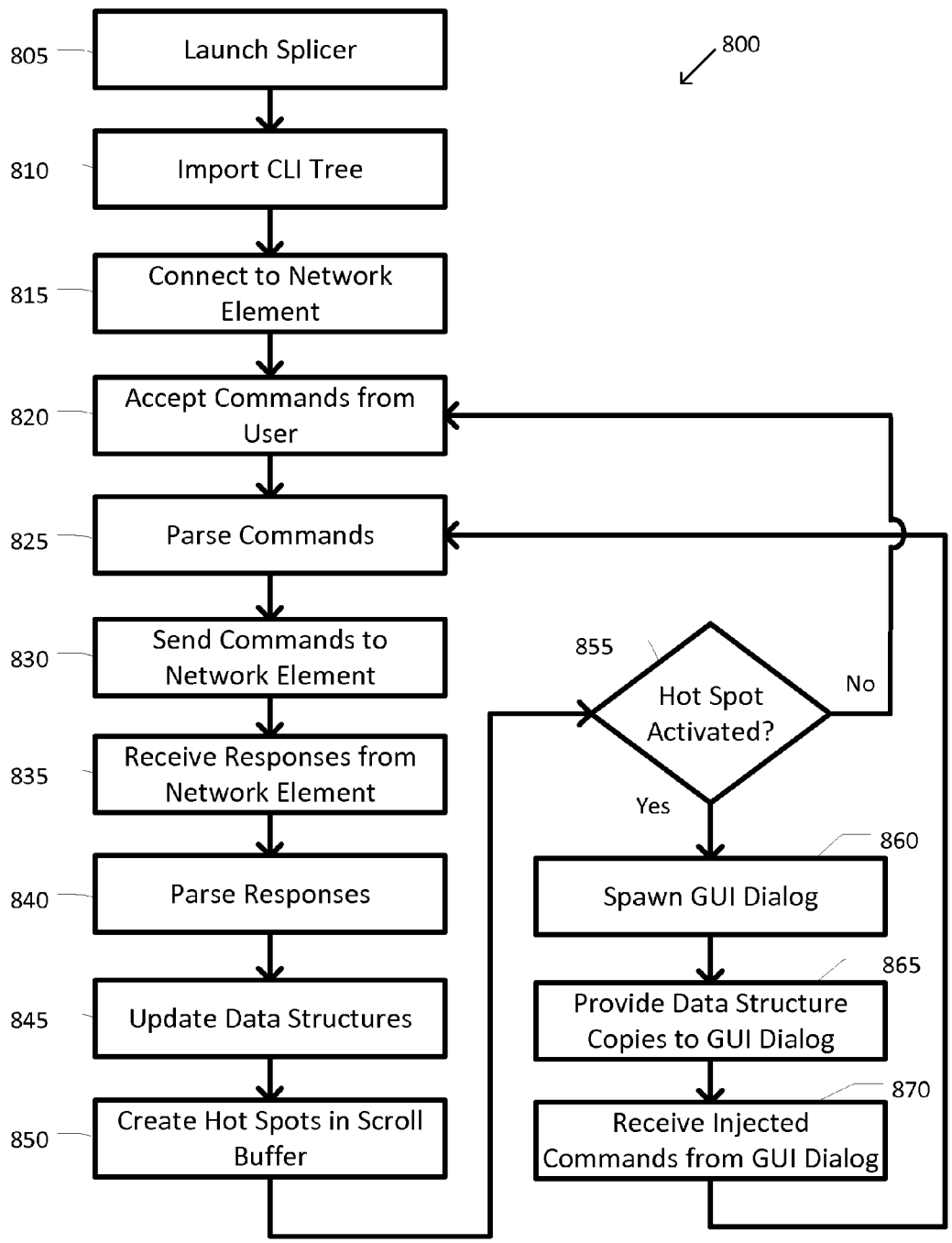
FIG. 8 is a simplified diagram showing a method of network element management according to some embodiments.

FIG. 8 is a simplified diagram showing a method 800 of network element management according to some embodiments. As shown in FIG. 8, the method 800 includes a process 805 for launching a splicer, a process 810 for importing a CLI tree, a process 815 for connecting to a network element, a process 820 for accepting commands from a user, a process 825 for parsing the commands; a process 830 for sending the commands to the network element, a process 835 for receiving responses from the network element, a process 840 for parsing the responses, a process 845 for updating data structures, a process 850 for creating hot spots in a scroll buffer, a process 855 for determining whether a hot spot is activated, a process 860 for spawning a GUI dialog, a process 865 for providing data structure copies to the GUI dialog, and a process 870 for receiving injected commands from the GUI dialog. According to certain embodiments, the method 800 of network element management can be performed using variations among the processes 805-870 as would be recognized by one of ordinary skill in the art. In some embodiments, one or more of the processes 810 and 870 may be omitted. In some embodiments, one or more of the processes 805-870 of method 500 may be implemented, at least in part, in the form of executable code stored on non-transient, tangible, machine readable media that when run by one or more processors (e.g., the one or more processors 160) may cause the one or more processors to perform one or more of the processes 805-870.

At the process 805, a splicer is launched. In some examples, the splicer may be a context-aware splicer. In some example, the splicer may provide a CLI with a CLI pane. In some examples, the splicer may include a workstation window with a scroll buffer (e.g., the scroll buffer 320). In some examples, the splicer may facilitate and support management of one or more network elements. In some examples, the splicer is the context-aware management workstation window 300. In some examples, the splicer is launched on a workstation. In some examples, the workstation may be a high-end workstation, a personal computer, a desktop, a laptop, a tablet computer, a personal data assistant (PDA), a smart phone, and/or any other type of network device allowing a user to connect to a network. In some examples, the workstation is the workstation 150.

At the optional process 810, a CLI tree is imported. In some examples, the CLI tree includes semantics of commands and responses to be exchanged with a network element. In some examples, the CLI tree may be imported from a file. In some examples, the CLI tree to import may be selected from a list. In some examples, the CLI tree to import may be determined based on a model and/or version of the network element.

At the process 815, a connection is made to a network element. The splicer connects to the network element to send commands and receive responses from the network element. The commands and responses may be used to facilitate and support management of the network element. The connection to the network element is made using a network protocol. In some examples, the protocol may be selected from a group consisting of telnet, SSH, HTTP, SNMP, and the like. In some examples, the protocol chosen may depend on a type of the network element and/or the protocols supported by the network element. In some examples, the connection may use an address for the network element. In some examples, the address may be an IP address. In some examples, the connection may use login credentials. In some examples, the login credentials may include a username and a password. In some examples, the connection may use encrypted communication. In some examples, the network element may be selected from the one or more network elements 110.

At the process 820, commands are accepted from a user. In some examples, the user of the splicer may enter commands into the CLI pane. In some examples, the commands may be entered in response to a prompt provided by the network element. In some examples, the commands may be provided by one or menus, controls, and/or dialogs. In some examples, the user may be a network operator.

At the process 825, the commands are parsed. As the commands are accepted from the user, the splicer may parse the commands to infer information about configuration and/or status of the network element. In some examples, the commands may be parsed based on the semantics from the CLI tree imported during the process 810. In some examples, as the commands are parsed, the splicer may recommend context-specific options for the commands being accepted from the user.

At the process 830, the commands are sent to the network element. After the commands are accepted from the user during the process 820, they are sent to the network element. The commands are sent to the network element using the connection established during the process 815. In some examples, the commands may not be sent until the user indicates the command is complete. In some examples, the command is complete when the return key is pressed.

At the process 835, responses are received from the network element. After the network element receives the commands sent during the process 830, the network element prepares and sends back corresponding responses. In some examples, the responses may include information related to the configuration and/or status of the network element. In some examples, each of the responses may be followed by the prompt. In some examples, as the splicer receives the responses, they may be displayed to the user and recorded in a scroll buffer. In some examples, the responses may be received using the connection established during the process 815.

At the process 840, the responses are parsed. As the responses are received from the network element, the splicer may parse the responses to infer information about the configuration and/or status of the network element. In some examples, the responses may be parsed based on the semantics from the CLI tree imported during the process 810.

At the process 845, data structures are updated. Based on the parsing of the commands during the process 825 and the parsing of the responses during the process 845, the splicer updates one or more data structures. The one or more data structures include the inferred information associated with the network element and one or more network objects associated with the network element. In some examples, the one or more network objects may include fans, sensors, power supplies, ports, and the like. In some examples, at least one data structure may be associated with each of the one or more network objects. In some examples, when the parsing identifies a previously unknown object, one or more data structures are created with corresponding inferred information stored therein. In some examples, when the parsing identifies new and/or changed inferred information, the corresponding data structures are updated to reflect the new and/or changed inferred information. In some examples, the data structures are stored in memory (e.g., the memory 170).

At the process 850, hot spots are created in the scroll buffer. Based on the parsing of the commands during the process 825 and the parsing of the responses during the process 845, the splicer may create hot spots associated with the one or more network objects. In some examples, the hot spots are associated with locations in the scroll buffer where a name and/or a description of a corresponding object appears. In some examples, more than one hot spot may be created for a same object. In some examples, a hot spot may be created for each place the same object appears in the scroll buffer. In some examples, the hot spots may be denoted by a dashed box around each of the hot spots. In some examples, the hot spots may not be visually highlighted. In some examples, the hot spots may be designated using highlighting and/or alternative text colors. Each of the hot spots may represent an active area in the scroll buffer. In some examples, the hot spots may designate a region of the scroll buffer that may be selected and/or activated by the user using a pointing device, such as a mouse.

At the process 855, it is determined whether a hot spot is activated. In some examples, the user may select and activate a hot spot to receive more information about the configuration and/or status of the corresponding object. In some examples, the user may select and activate the hot spot to manage the corresponding object. In some examples, the hot spot may be activated by a left mouse button press when a cursor is over the hot spot. In some examples, the hot spot may be activated by a double mouse button press, a triple mouse button press, a right mouse button press, a mouse button press with a key board key press (e.g., shift), and the like. In some examples, a type of event that activates the hot spot may be configurable. When it is determined that a hot spot is activated, a GUI dialog is launched using the process 860. When it is determined that a hot spot is not activated, more commands may be accepted from the user using the process 820.

At the process 860, a GUI dialog is spawned. When a hot spot is activated, the splicer may spawn the GUI dialog to provide additional information about an object that corresponds to the activated hot spot. In some examples, the GUI dialog may display inferred information associated with corresponding object. In some examples, the GUI dialog may provide one or more controls for changing one or more properties of the corresponding object. In some examples, the spawned GUI dialog may be the dialog 600, 700, and/or 760. In some examples, templates and/or specifications for the GUI dialog may be selected based on a type of the network element. In some examples, the templates and/or specifications may be selected based on a CLI tree imported during the process 810. In some examples, the templates and/or specifications may be included in the imported CLI tree.

At the process 865, data structure copies are provided to the GUI dialog. In order to display the inferred information associated with the corresponding object, the splicer provides copies of the data structures for the corresponding object to the GUI dialog spawned during the process 860. In some examples, when the one or more properties of the corresponding object are changed using the GUI dialog, the copies of the data structures may be updated. In some examples, the GUI dialog may further return additional copies of the data structures to the splicer so that the splicer may update its own data structures associated with the corresponding object. In some examples, the splicer may provide updated copies of the data structures when the configuration and/or status of the corresponding object changes. In some examples, the GUI dialog may validate any change before updating the copies of the data structures.

At the optional process 870, injected commands are received from the GUI dialog. When the one or more properties of the corresponding object are changed using the GUI dialog, the GUI dialog may provide injected commands to the splicer to implement the changes. The injected commands may then be parsed by the splicer using the process 825 and sent to the network element using the process 830. In some embodiments, the GUI dialog may alternatively spawn its own splicer and/or connect to the network element directly. In some examples, the injected commands may be formed based on the semantics included in the CLI tree imported during the process 810.

Some embodiments of the workstation 150 may include non-transient, tangible, machine readable media (e.g., the memory 170) that include executable code that when run by the one or more processors 160 may cause the one or more processors 160 to perform the processes of method 800 as described above. Some common forms of machine readable media that may include the processes of method 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A context-aware splicer for managing network elements, the splicer comprising:
 a management window;
 a scroll buffer configured to store commands and responses;
 a console pane displayed in the management window and being configured to display a portion of the scroll buffer; and
 one or more data structures;
 wherein the splicer is configured to:
  connect to a network element using a network, the network element being associated with one or more network objects;
  accept commands entered in the console pane;
  parse the commands;
  send the commands to the network element over the network;
  receive responses from the network element over the network;
  parse the received responses;
  update the one or more data structures based on information associated with the parsed commands and the parsed responses, each of the one or more data structures being associated with a corresponding network object selected from the one or more network objects;
  create one or more hot spots in the scroll buffer over one or more corresponding network object identifiers detected in previously entered and parsed commands and the received and parsed responses, the one or more corresponding network objects being selected from the one or more network objects;

determine whether a first hot spot selected from the one or more hot spots is activated;

spawn a first GUI dialog based on a first network object associated with the first hot spot when the first hot spot is activated; and provide copies of one or more first data structures selected from the one or more data structures to the first GUI dialog, the one or more first data structures being associated with the first network object.

2. The splicer of claim 1 wherein the splicer is further configured to import a CLI tree that describes syntax of the commands and responses.

3. The splicer of claim 2 wherein the CLI tree is imported from a file.

4. The splicer of claim 1 wherein the splicer is further configured to select a CLI tree that describes syntax of the commands and responses based on a type of the network element.

5. The splicer of claim 1 wherein the splicer is further configured to:

receive injected commands from the first GUI dialog;
parse the injected commands; and
send the injected commands to the network element over the network.

6. The splicer of claim 5 wherein the first GUI dialog is further configured to:

display information from the one or more first data structures; and provide the injected commands based on edits made in the first GUI dialog and controls activated in the first GUI dialog.

7. The splicer of claim 1 wherein the splicer is further configured to provide updated copies of the one or more first data structures to the first GUI dialog.

8. The splicer of claim 1 wherein:

the splicer is further configured to recommend context-specific options while the commands are accepted in the console pane; and the context-specific options are based on information associated with the one or more data structures.

9. The splicer of claim 1 wherein the splicer is further configured to connect to the network element using one or more protocols selected from a group consisting of telnet, SSH, HTTP, and SNMP.

10. The splicer of claim 1 wherein the splicer is further configured to:

receive one or more modified copies of the one or more first data structures from the first GUI dialog; and update the one or more data structures based on the modified copies of the one or more first data structures.

11. The splicer of claim 1 wherein the splicer is further configured to:

insert the commands into the scroll buffer; and
insert the responses into the scroll buffer.

12. The splicer of claim 1 wherein the splicer is further configured to:

determine whether a second hot spot selected from the one or more hot spots is activated;

spawn a second GUI dialog based on a second network object associated with the second hot spot when the second hot spot is activated; and provide copies of one or more second data structures selected from the one or more data structures to the second GUI dialog, the one or more second data structures being associated with the second network object.

13. The splicer of claim 1 wherein the one or more hot spots are visually highlighted.

14. A method of managing network elements, the method comprising:

launching a context-aware splicer including a console pane and a scroll buffer;

connecting to a network element using a network, the network element being associated with one or more network objects;

accepting commands entered in the console pane;
parsing the commands;
sending the commands to the network element over the network;

receiving responses from the network element over the network;

parsing the received responses;

updating one or more data structures based on information associated with the parsed commands and the parsed responses, each of the one or more data structures being associated with a corresponding network object selected from the one or more network objects;

creating one or more hot spots in the scroll buffer over one or more corresponding network object identifiers detected in previously entered and parsed commands and the received and parsed responses, the one or more corresponding network objects being selected from the one or more network objects;

determining whether a first hot spot selected from the one or more hot spots is activated;

spawning a GUI dialog based on a first network object associated with the first hot spot when the first hot spot is activated; and providing copies of one or more first data structures selected from the one or more data structures to the GUI dialog, the one or more first data structures being associated with the first network object.

15. The method of claim 14, further comprising importing a CLI tree that describes syntax of the commands and responses.

16. The method of claim 14, further comprising:
receiving injected commands from the GUI dialog;
parsing the injected commands; and
sending the injected commands to the network element over the network.

17. The method of claim 14, further comprising providing updated copies of the one or more first data structures to the GUI dialog.

18. The method of claim 14, further comprising:
receiving one or more modified copies of the one or more first data structures from the GUI dialog; and
updating the one or more data structures based on the modified copies of the one or more first data structures.

19. An information handling system comprising:
a workstation; and
a splicer being executed on the workstation, the splicer comprising:
a management window;
a scroll buffer configured to store commands and responses;
a console pane displayed in the management window and being configured to display a portion of the scroll buffer; and
one or more data structures;
wherein the splicer is configured to:
connect to a network element using a network, the network element being associated with one or more network objects;

accept commands entered in the console pane;
parse the commands;
send the commands to the network element over the network;
receive responses from the network element over the network;
parse the received responses;
update the one or more data structures based on information associated with the parsed commands and the parsed responses, each of the one or more data structures being associated with a corresponding network object selected from the one or more network objects;
create one or more hot spots in the scroll buffer over one or more corresponding network object identifiers detected in previously entered and parsed commands and the received and parsed responses, the one or more corresponding network objects being selected from the one or more network objects;
determine whether a first hot spot selected from the one or more hot spots is activated;
spawn a first GUI dialog based on a first network object associated with the first hot spot when the first hot spot is activated; and
provide copies of one or more first data structures selected from the one or more data structures to the first GUI dialog, the one or more first data structures being associated with the first network object.

20. The information handling system of claim 19 wherein the workstation is selected from a group consisting of a high-end workstation, a personal computer, a desktop, a laptop, a tablet computer, a personal data assistant (PDA), and a smart phone.

* * * * *